United States Patent [19]

Nickum

[11] 4,305,716
[45] Dec. 15, 1981

[54] ROTARY DIE CUTTING MACHINE HAVING INTEGRAL SCRAP STRIPPER

[75] Inventor: Robert H. Nickum, Cincinnati, Ohio

[73] Assignee: Cincinnati Rotary Press Company, Cincinnati, Ohio

[21] Appl. No.: 124,860

[22] Filed: Feb. 26, 1980

[51] Int. Cl.³ ............................ B31B 1/20; B26D 7/18
[52] U.S. Cl. ..................................... 493/342; 493/373
[58] Field of Search .................. 493/342, 373, 82, 83, 493/370; 83/103, 113, 161

[56] References Cited

U.S. PATENT DOCUMENTS

| | | | |
|---|---|---|---|
| 1,487,661 | 3/1924 | Langston | 493/342 X |
| 2,647,446 | 8/1953 | Kane | 493/373 X |
| 3,186,274 | 6/1965 | Winkler et al. | 493/342 X |
| 3,371,584 | 3/1968 | Zernov | 493/373 |
| 3,391,589 | 7/1968 | Bishop | 493/373 X |
| 3,459,080 | 8/1969 | Goettsch | 493/373 |
| 3,643,553 | 2/1972 | Morimoto | 493/373 |
| 3,758,102 | 9/1973 | Munn et al. | 493/342 |
| 3,834,291 | 9/1974 | Bishop | 493/373 |
| 3,877,353 | 4/1975 | Smith et al. | 493/373 |
| 4,109,842 | 8/1978 | Aquilla | 493/342 X |

Primary Examiner—James F. Coan
Attorney, Agent, or Firm—Frost & Jacobs

[57] ABSTRACT

A rotary die cutting machine having an integral scrap stripper for separating the scrap portion from the product portion of the cut sheet. The rotary die cutting machine includes a rotatably mounted cylindrical die cutting roll including a number of circumferentially and longitudinally extending upstanding rule-like dies affixed to the outer surface of the roll and defining a pattern for cutting a sheet into a product portion and a scrap portion. The scrap stripper includes a plurality of pin-like impaling members projecting outwardly from the roll, the pin-like members being positioned on the roll so as to pierce and hold the scrap portions to the roll such that the product portion separates from the scrap portion as the roll rotates. One or more blade-like scrapping knives having an edge resting substantially against the outer surface of the roll operate to peel the scrap portion from the roll as the roll rotates, causing the product portion and the scrap portion to assume separate paths of travel from the rotary die cutting machine. In order to prevent contact between the scrapping knives and the longitudinally extending rule-like dies, gaps or interruptions are provided in the dies by means of a cutting wheel to permit the passage of the scrapping knives therethrough.

10 Claims, 7 Drawing Figures

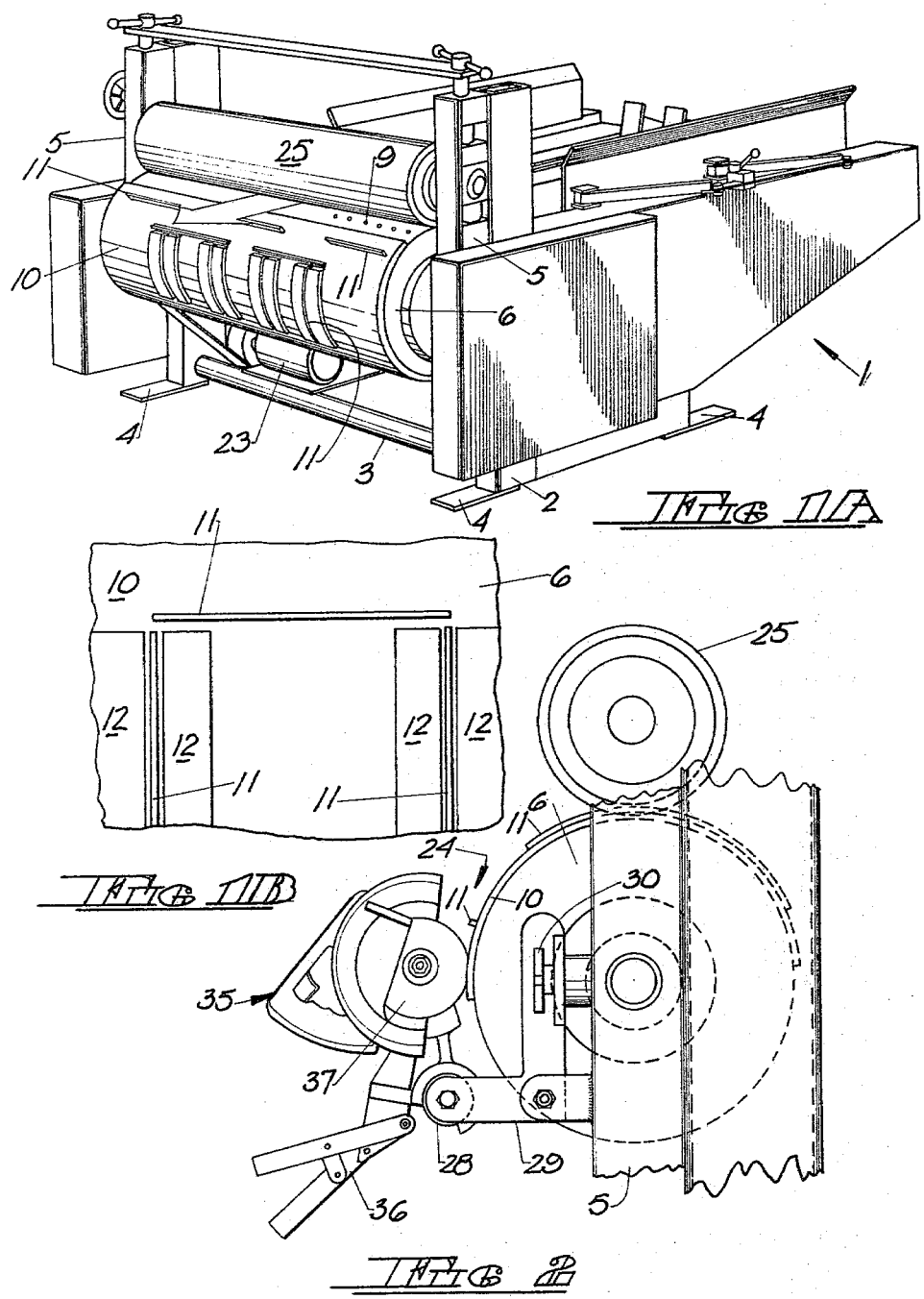

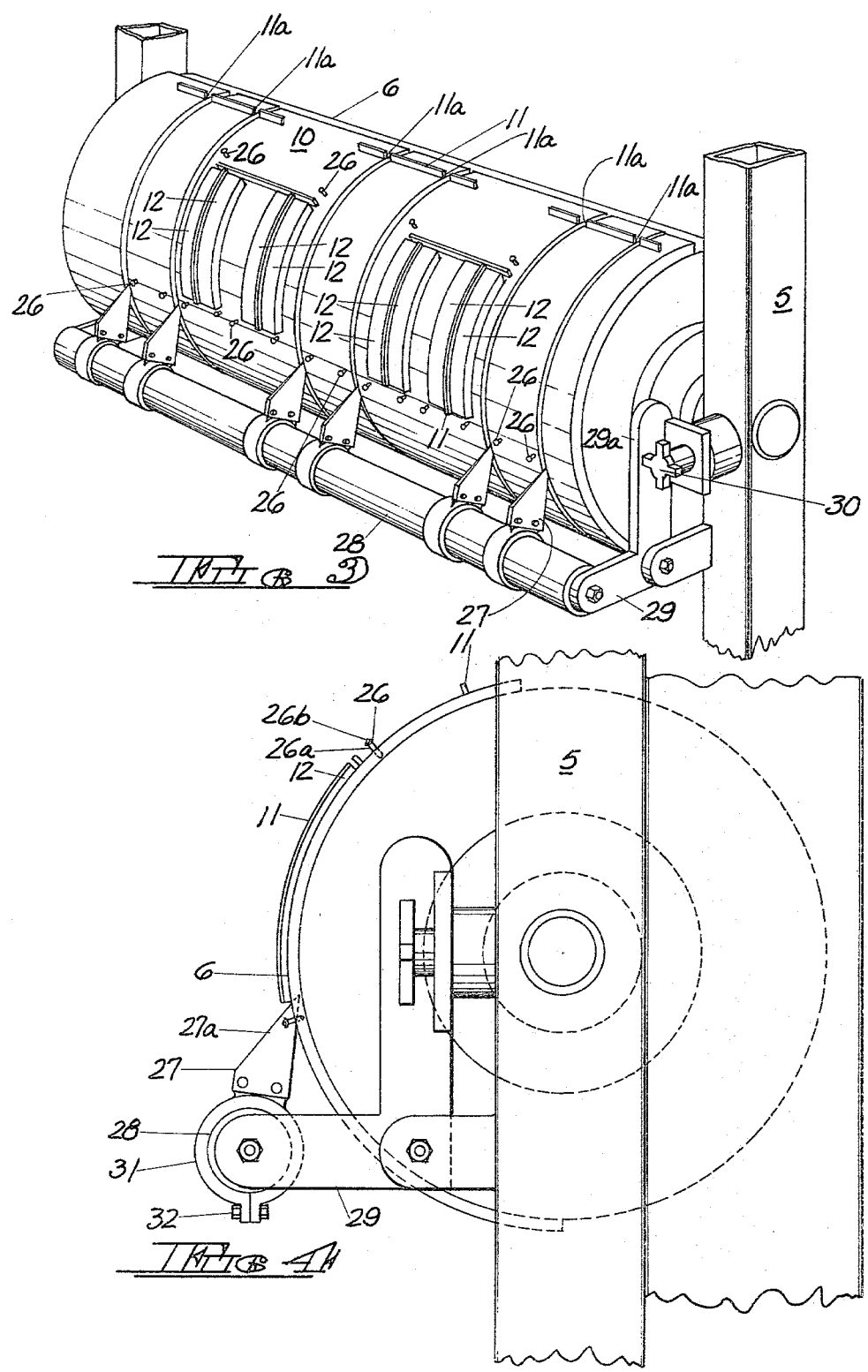

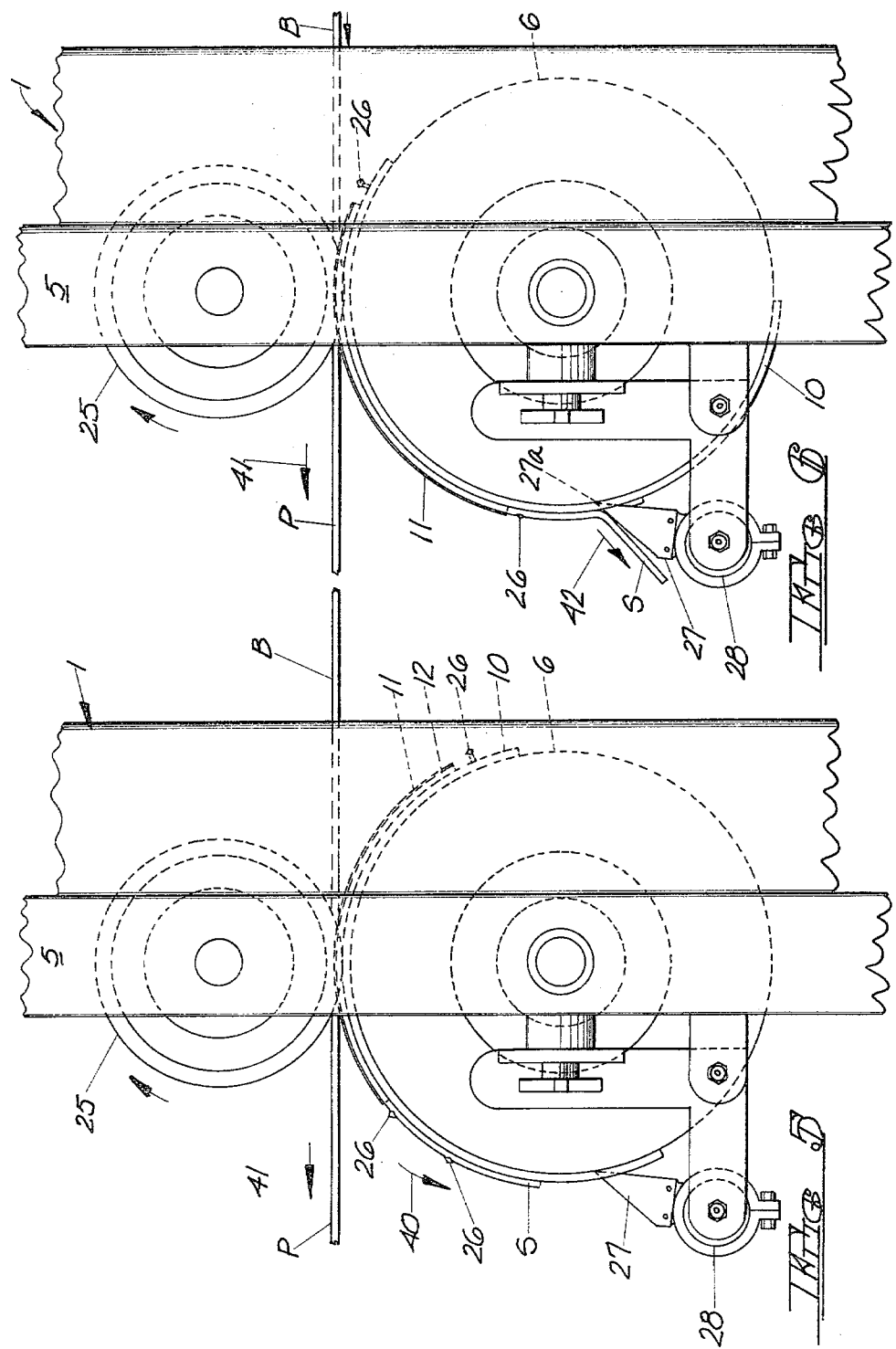

4,305,716

ROTARY DIE CUTTING MACHINE HAVING INTEGRAL SCRAP STRIPPER

SUMMARY OF THE INVENTION

Many methods have been proposed for the production of cardboard and other blanks wherein a pattern of cuts and score lines is made so as to define, for example, a base, side walls, a lid and flaps of a carton. In situations where high volume production of paperboard or cardboard cutting or scoring is required, rotary die cutting machines are often used, employing a cylindrical cutter roller rotating at relatively high speed which mounts a plurality of upstanding rule-like cutting dies accurately arranged in the desired pattern of cutting or scoring to be impressed upon the paperboard or cardboard blanks. The rotating cutter roll is configured to bear against a cylindrical anvil or back-up roll which provides a resilient cutting surface for the rule-like dies.

A stack of sheet blanks is supported adjacent the counter-rotating rolls, with the bottommost sheet fed between the rolls by means of a pusher or kicker. The forwardmost edge of each sheet is drawn through the roll nip such that the dies produce the desired cutting or scoring impression on the sheet. The processed sheets are forced outwardly through the rolls where additional operations such as stripping, stacking or the like may take place.

Various methods have been proposed for separating the scrap or waste from the blank material following the cutting and scoring operation. Commonly, the scrap is removed by hand, and conveyed either manually or automatically to a disposal station. It has also been suggested to provide a separate stripping station immediately following the cutting and scoring operation to remove the waste material from the blank. For example, in U.S. Pat. No. 2,647,446, issued Aug. 4, 1953 to Gideon Kane, a separate stripping mechanism includes a pair of rolls between which the cut blank is fed, one of these rolls being provided with pins disposed to engage the waste portions of the blank and upon which the waste portions are impaled as the blank passes to the delivery mechanism following the stripper. The impaled waste portions are subsequently removed from the pins to separate it from the blank material. It has been found, however, that such stripping mechanisms require accurate placement with respect to the cutting and scoring machine, and must also operate in accurate synchronism to prevent jamming of the sheets as they pass through the stripper. Furthermore, the use of such separate stripping mechanisms generally require substantial additional moving parts, expense and maintenance, as well as large amounts of floor space adjacent the cutting and scoring machine.

The present invention overcomes many of these disadvantages by incorporating the stripping mechanism as an integral part of the rotary die cutting machine. As is well known in the art, a typical rotary die cutting machine, such as that described in my copending U.S. Patent Application Ser. No. 24,978, filed Mar. 29, 1979, and assigned to the same assignee, includes a cylindrical die cutting roll rotatably mounted between vertical frame members. Generally, the die cutting roll is constructed of steel or the like, and is provided with an overlying plywood layer or base which contains a number of outwardly projecting horizontal and vertically oriented metallic die cutting or scoring blades arranged in the desired pattern. Often pieces of a resilient material such as sponge rubber or the like are positioned adjacent the rule dies to assist in ejecting the scrap and product from the cutting die following the cutting and scoring operation, and insure that the scrap and product are separated from the cutting roll.

On the other hand, the present invention includes means associated with the die cutting roll for stripping the scrap from the product. In a preferred embodiment, the scrapping means includes a plurality of pin-like impaling members projecting outwardly from the outer surface of the roll, and positioned on the roll so as to pierce and hold the scrap portions of the sheet material to the roll, while the product portion separates from the scrap portion as the roll rotates. The product portion may then be immediately stacked, or conveyed to another location for further processing such as printing or folding. The scrap portion adhering to the outer surface of the die cutting roll by means of the impaling members rotates with the roll and is peeled from the roll surface by means of a plurality of obtaining blade-like scrapping knives affixed to a support bar extending adjacent the surface of the die cutting roll. Each scrapping knife has a pointed edge which rides on the outer surface of the roll so as to lift and separate the scrap portion adhering to the roll. The scrapped portion may then be conveyed from the rotary die cutting machine as desired for disposal.

In order to prevent the scrapping knives from interfering with the longitudinally extending rule-like dies positioned on the cutting roll, a plurality of circumferentially extending narrow grooves are provided so as to produce interruptions in the longitudinally extending rule dies of sufficient width to permit the scrapping knives to pass therewithin. As will be explained in more detail hereinafter, the edges of the scrapping knives ride against the outer surface of the cutting roll, and operate to separate the adhering scrap portion from the impaling members as the roll rotates.

In a preferred method of fabricating the stripping means of the present invention, a circular saw having a thin cutting wheel is clamped to the scrapping knife support bar so that the cutting wheel bears against the plywood surface of the cutting roll. The cutting roll is then rotated so as to produce a shallow narrow groove in the plywood roll covering, and the aforementioned grooves or interruptions in the longitudinally extending rule-like dies. When this operation is completed, the circular saw is removed from the support bar, and the cutting knives attached to the support bar at the proper locations.

Further features of the invention will become apparent from the detailed description which follows.

BRIEF DESCRIPTION OF THE DRAWING

FIG. 1A is a front perspective view of a typical rotary die cutting machine.

FIG. 1B is a fragmentary front elevation view of the die cutting roll of the rotary die cutting machine of FIG. 1A.

FIG. 2 is a fragmentary side elevation view illustrating the method for providing a circumferentially extending groove in the die cutting roll of the rotary die cutting machine of FIG. 1A.

FIG. 3 is a fragmentary front perspective view of the stripping means of the present invention.

FIG. 4 is an enlarged fragmentary side elevation view of the stripping means of the present invention illustrated in FIG. 3.

FIG. 5 is a fragmentary side elevation view of the stripping means of FIG. 3 illustrating the product position separated from the scrap position.

FIG. 6 is a fragmentary side elevation view of the stripping means of FIG. 3 illustrating the scrap portion separated from the die cutting roll.

DETAILED DESCRIPTION

A typical rotary die cutting machine, shown generally at 1, is illustrated in FIG. 1A, and may be of the type described in detail in my copending patent application Ser. No. 24,978, filed Mar. 29, 1979 and assigned to the same assignee. In general, the rotary die cutting machine 1 is supported by a pair of spaced horizontal frame members, one of which is shown at 2, connected by a pair of transversely extending tubular members, one of which is shown at 3, which together form a stable platform upon which the remainder of the machine rests. Further stability, as well as means for attaching the machine to the floor or the like, is provided by legs 4 extending outwardly from the corners of frame members 2. A vertical frame member 5 is attached at its lower end to the forward end of each lower horizontal frame member 2. Cylindrical die cutting roll 6 is rotatably mounted between vertical frame members 5 by means of bearings or the like (not shown) supporting the ends of the die cutting roll shaft. In general, die cutting roll 6 is constructed of steel or similar material, and contains a plurality of spaced threaded holes, some of which are shown at 9. Die cutting roll 6 is also provided with a support base or covering 10 constructed of plywood or the like, which extends completely or partially around the surface of die cutting roll 6, and which may also contain a number of outwardly projecting metallic rule-like die cutting or scoring blades 11 arranged in a particular desired pattern. It will be observed that some of the rule-like dies or blades extend circumferentially on roll 6, while others are positioned longitudinally thereof. Support base 10 is secured to die cutting roll 6 by means of threaded fasteners, not shown, passing through the support base into the threaded holes 9 as is well known in the art.

In general, means are also provided for insuring that the product and scrap portions of the cardboard or paperboard sheets are ejected from the die cutting roll 6 as the roll rotates. Usually, these ejection means take the form of strips or lumps 12 of rubber or other resilient material which are positioned adjacent the rule-like dies 11, and assist in urging the severed portions of the sheet outwardly away from the outer surface of roll 6. In general, ejection means 12 are positioned by the die maker as required to insure proper ejection of the product and scrap. Usually, the ejection means are so arranged that the product and scrap portions leave the die cutting roll in a single perforated piece, such that separation of the scrap from the product must be made by other manual or automatic means not shown.

An electric motor 23 rigidly affixed to the rotary die cutting machine frame is utilized to rotate roll 6 at the desired speed through drive means (not shown) in the direction as illustrated in FIG. 2 by directional arrow 24.

An anvil or back-up roll 25 is rotatably mounted overlying die cutting roll 6 and is of cylindrical shape, and of smaller diameter than die cutting roll 6. The outer surface of roll 25 may also be covered with a mat of resilient material such as polyurethane or the like in order to provide a resilient surface for the rule-like dies 11 to work against. In normal operation, back-up roll 25 will be adjusted vertically so that the outermost edges of die-like rules 11 protrude slightly into the resilient surface of the anvil roll. In this manner, anvil roll 25 may be made free-wheeling, and is driven by contact with roll 6, thus eliminating registration problems which might otherwise occur if anvil roll 25 were separately powered.

In operation, a cardboard sheet or the like is fed between die cutting roll 6 and anvil roll 25, and is expelled from the forward end of rotary die cutting machine 1 as illustrated in FIG. 1A. As the die cutting roll rotates, the desired impressions or cut portions are impressed on the cardboard sheet as described hereinabove.

The present invention, illustrated generally in FIG. 3–FIG. 6, provides means associated with die cutting roll 6 for stripping the scrap portion from the product portion of the cardboard sheets. As best illustrated in FIG. 3, these stripping means are formed by a plurality of pin-like impaling members, shown at 26, which project upwardly from the outer surface of cutting roll 6. As shown in FIG. 4, each impaling member 26 includes a substantially cylindrical shaft 62a terminating in a mushroom-shaped pointed head 26b. The lower end of each impaling member terminates in a nail-like point, permitting the members 26 to be driven into the plywood base covering 10 on roll 6 and thereby firmly secured thereto. Impaling members 26 will be of such a height as to pierce the associated portions of the cardboard sheet as the sheet is pressed between die cutting roll 6 and anvil roll 25 so as to securely hold these portions of the sheet to the die cutting roll. Furthermore, as illustrated in FIG. 3, impaling members 26 will be positioned so as to pierce only the scrap portions of the sheet and thereby separate them from the product portions. In other words, as die cutting roll 6 rotates, the scrap portions of the cardboard sheet are pierced by impaling members 26 and thereby held to the cutting roll, while the product portions of the cardboard sheet, having been severed from the scrap portions, are ejected from die cutting roll 6 by the ejection rubber members 12.

The specific location of impaling members 26 will depend upon the particular pattern or configuration of the scrap and product portions of the cardboard sheets. In general, members 26 will be located so as to impale or pierce the scrap portions, but not the product portions.

The present invention also includes means for separating the scrap portions adhering to the die cutting roll 6 as the roll rotates. As illustrated in FIG. 3, the separating means includes a plurality of spaced blade-like scrapping knives, one of which is shown at 27, having a pointed edge portion 27a configured to contact the surface of the die cutting roll 6 so as to lift and remove the scrap portions adhering to the roll.

Stripping knives 27 are supported by a rod-like support bar 28 spaced from and extending across cutting roll 6. Support bar 28 is supported at its ends by means of L-shaped support brackets 29. The upper arm 29a of bracket 29 is secured to vertical support member 5 by means of a threaded securing member 30. It will be observed that this arrangement permits support bar 28 to be removed in those applications where the automatic stripping feature is not required.

Blades 27 are secured to support bar 28 by means of a split-ring clamping member 31 which may be tightened as required by means of threaded fastener 32 to tightly hold the stripping knives in place such that the upper edge 27a of the knives ride on the upper surface of cutting roll 6. It will also be observed that by loosening threaded fastening member 32, the stripping knives and associated clamping member may be positioned at any point along support member 28 to accommodate different types of rule-like die patterns.

It will also be observed that means are provided to prevent interference between the longitudinally extending die rule blades 11 and the edge 27a of stripping knives 27 in the form of narrow interruptions or gaps 11a in the longitudinal rule-like dies to permit the passage of the upper edge 27a of the stripping knives therethrough. In general, the width of gaps 11a will be rather narrow, in no event more than about ⅛ inch, to insure clean separation between the severed portions and prevent tearing.

In general, stripping knives 27 will be positioned so as to cleanly peel the adhering cardboard scrap from cutting roll 6 in one continuous operation, thereby resulting in the minimum number of individual scrap portions which must be handled.

It will be observed that the longitudinally extending rule-like dies 11 may be formed in several parts, with the appropriate gaps 11a provided between adjacent parts to permit passage of the stripping knives 27. However, in many instances the close tolerances required by dies of the type described make this method of fabrication undesirably expensive and time consuming. Consequently, the present invention provides for improved means for facilitating the fabrication of the stripping means by providing a narrow groove extending circumferentially through the longitudinally extending rule-like dies as illustrated in FIG. 2 and FIG. 3. In this arrangement, stripping knives 27 and their associated clamping members are either removed or positioned at the ends of support bar 28. An electrically powered circular saw, illustrated in FIG. 2 generally at 35, is securely clamped by means of clamping means 36 to support bar 28. Circular saw 35 mounts a resinoid wheel 37 or similar cutting disc capable of abrading the die material. As shown in FIG. 2, circular saw 35 is positioned so that the cutting wheel 37 slightly abrades the outer plywood base layer or covering 10 of cutting roll 6. With the circular saw 35 operating, cutting roll 6 is rotated, thereby producing the circumferentially extending groove 38, as well as the gaps or interruptions 11a in longitudinally extending rule-like dies 11. It will be observed that the thickness of the cutting wheel or disc 37 is such that the width of the gaps 11a is sufficient to just pass the stripping knives 27, but in no event greater than ⅛ inch in order to prevent tearing of the cardboard material.

When the cutting or abrading operation is completed, circular saw 35 may be removed from support bar 28, and the stripping knives 27 positioned therealong as described hereinabove. It will be observed that this method of fabrication may be performed quickly and easily with minimum required skill, without sacrificing the accuracy or alignment of the completed dies.

The operation of the stripping means of the present invention is illustrated in FIG. 5 and FIG. 6. A cardboard sheet B is positioned at the nip point of die cutting roll 6 and anvil roll 25, and is drawn therebetween, rule-like dies 11 producing the desired cutting and/or scoring of the sheet to produce a product portion P and a scrap portion S, as shown in FIG. 5. The scrap portion S, being impaled by pin-like impaling members 26, adheres to the outer surface of roll 6, and is carried downwardly therealong as indicated by directional arrow 40. However, product portion P is urged outwardly from the dies 11 by means of resilient rejecting means 12, and assumes a substantially straight path as indicated by directional arrow 41. Consequently, the structure and operation of the stripping means of the present invention produces separate paths of travel for the product and scrap portions of the blank. To further enhance this affect, the ejection means 12 may be removed from the portion of die cutting roll 6 contacted by the scrap portion S, to insure that the scrap portion remains in contact with the outer surface of roll 6. Consequently, a significant amount of ejection rubber material may be saved in the present invention.

When the rotation of die cutting roll 6 has advanced to that shown in FIG. 6, the upper edges 27a of scrapping knives 27 operate to peel the scrap portion S from the outer surface of roll 6 and direct it along a path of travel indicated by directional arrow 42. At this point, the scrap portion S and product portion P may be removed from the rotary die cutting machine 1 by conveying means or the like, not shown.

It will be understood that various changes in the details, materials, steps and arrangements of parts, which have been herein described and illustrated in order to explain the nature of the invention, may be made by those skilled in the art within the principle and scope of the invention as expressed in the appended claims. In particular, as used herein, the term "longitudinally extending", means a member having a directional component extending parallel to the axis of the die cutting roll. In other words, the member is not perpendicular to the axis of the die cutting roll.

The embodiments of the invention in which an exclusive property or privilege is claimed are as follows:

1. In a rotary die cutting machine of the type having a rotatably mounted cylindrical die cutting roll including die means affixed to the outer surface of said roll, said die means including a plurality of circumferentially and longitudinally extending upstanding rule-like dies defining a pattern for cutting a sheet into a product portion and a scrap portion, the improvement in combination therewith comprising means associated with said die cutting roll for stripping the scrap portion from the product portion, said stripping means including:
a plurality of pin-like impaling members projecting outwardly from said roll, said pin-like members being positioned on said roll so as to pierce and hold said scrap portions to said roll, such that the product portion separates from the scrap portion as said roll rotates;
means for ejecting said product portion from said roll;
means for separating said scrap portion from said roll as said roll rotates, said separating means comprising a blade-like scrapping knife having an edge resting substantially against the outer surface of said roll, said knife edge being positioned to peel said scrap portion from said roll as said roll rotates; and
means for preventing contact between said separating means and said dies.

2. The rotary die cutting machine according to claim 1 including a wooden base layer covering a part at least of said roll surface and mounting said dies, said impaling members having an upper mushroom-shaped head end for piercing and holding said scrap portion and a lower naillike end driven into said base layer to secure said members thereto.

3. The rotary die cutting machine according to claim 1 wherein said contact preventing means comprises a gap in said longitudinally extending dies of sufficient width to just permit said knife to pass therethrough.

4. The rotary die cutting machine according to claim 1 including means spaced from said roll and extending longitudinally therealong for supporting said scrapping knife, and means positioning said knife at selected positions along said support means.

5. The rotary die cutting machine according to claim 1 wherein said separating means is positioned such that said ejected product portion and said separated scrap portion assume different paths of travel.

6. The rotary die cutting machine according to claim 3 wherein said gap is no greater than ⅛ inch in width.

7. The rotary die cutting machine according to claim 3 including a circumferentially extending groove inscribed in the outer surface of said roll, said knife edge resting in said groove.

8. In a rotary die cutting machine of the type having a rotatably mounted cylindrical die cutting roll including die means affixed to the outer surface of said roll, said die means including a plurality of circumferentially and longitudinally extending upstanding rule-like dies defining a pattern for cutting a sheet into a product portion and a scrap portion, the method of fabricating means for stripping the scrap portion from the product portion, said method including the steps of:

providing means associated with said roll for ejecting said product portion from said roll;

providing means for holding said scrap portion to said roll to separate said scrap portion from said product portion;

providing means for separating said scrap portion from said roll, said separating means including a blade-like scrapping knife having an edge resting substantially against the outer surface of said roll, said knife edge being positioned to peel said scrap portion from said roll as said roll rotates; and providing a narrow gap in one or more of said dies of sufficient width to just permit passage of said scrapping knife therethrough as said roll rotates.

9. The method according to claim 8 wherein said gap is formed by positioning a rotating cutting wheel adjacent said roll and rotating said roll so that said cutting wheel cuts said gap in said one or more dies.

10. The method according to claim 9 wherein said cutting wheel is positioned to circumscribe a shallow groove in the outer surface of said roll as said roll is rotated, said groove being configured to accept said scrapping knife edge.

* * * * *